United States Patent
Nieminen et al.

(10) Patent No.: US 12,162,991 B2
(45) Date of Patent: Dec. 10, 2024

(54) METHOD FOR RECYCLING POLYSTYRENE AND SOLVENT FOR DISSOLVING POLYSTYRENE

(71) Applicant: FF-FUTURE OY, Salo (FI)

(72) Inventors: Henri Nieminen, Salo (FI); Jarkko Leivo, Tampere (FI); Tuire Marin, Tampere (FI); Heli Kummala, Kempele (FI)

(73) Assignee: FF-FUTURE OY, Salo (FI)

( * ) Notice: Subject to any disclaimer, the term of this patent is extended or adjusted under 35 U.S.C. 154(b) by 526 days.

(21) Appl. No.: 17/621,898

(22) PCT Filed: Jun. 26, 2020

(86) PCT No.: PCT/FI2020/050470
§ 371 (c)(1),
(2) Date: Dec. 22, 2021

(87) PCT Pub. No.: WO2020/260774
PCT Pub. Date: Dec. 30, 2020

(65) Prior Publication Data
US 2022/0243028 A1    Aug. 4, 2022

(30) Foreign Application Priority Data
Jun. 28, 2019   (FI) .................................. 20195582

(51) Int. Cl.
*C08J 11/08*    (2006.01)

(52) U.S. Cl.
CPC ............ *C08J 11/08* (2013.01); *C08J 2325/06* (2013.01)

(58) Field of Classification Search
CPC .............................. C08J 11/08; C08J 2325/06
USPC .......................................................... 521/47
See application file for complete search history.

(56) References Cited

U.S. PATENT DOCUMENTS

| | | | | |
|---|---|---|---|---|
| 4,031,039 A | * | 6/1977 | Mizumoto | B29B 17/02 521/46.5 |
| 5,269,948 A | * | 12/1993 | Krutchen | C08J 11/08 528/48 |
| 5,278,282 A | | 1/1994 | Nauman et al. | |
| 6,098,649 A | * | 8/2000 | Noguchi | B29B 17/0026 220/23.6 |
| 2003/0036576 A1 | | 2/2003 | Nishimoto et al. | |
| 2007/0191500 A1 | * | 8/2007 | Sanders | C08J 11/08 521/47 |

(Continued)

FOREIGN PATENT DOCUMENTS

| | | |
|---|---|---|
| CN | 1143653 A | 2/1997 |
| CN | 106867322 A * | 6/2017 |

(Continued)

OTHER PUBLICATIONS

International Search Report and Written Opinion issued for Application No. PCT/FI2020/050470, dated Sep. 21, 2020 (9 pages).

(Continued)

*Primary Examiner* — Michael M. Bernshteyn
(74) *Attorney, Agent, or Firm* — Meunier Carlin & Curfman LLC

(57) ABSTRACT

A method for recycling polystyrene in a dissolution recycling process, in which method 1,3-dioxolane or isoamyl acetate is used as a solvent for dissolving polystyrene.

9 Claims, 1 Drawing Sheet

(56) References Cited

U.S. PATENT DOCUMENTS

2007/0191501 A1* 8/2007 Sanders .................. C08J 11/08
521/47
2008/0281002 A1* 11/2008 Maeurer .................. C08J 11/08
521/40.5

FOREIGN PATENT DOCUMENTS

| JP | H05263065 A | | 10/1993 |
|---|---|---|---|
| JP | H09220556 A | | 8/1997 |
| JP | 2002265663 A | * | 9/2002 |
| KR | 20030069008 A | | 8/2003 |
| WO | 2007014907 A1 | | 2/2007 |

OTHER PUBLICATIONS

Search Report issued for Finnish Patent Application No. 20195582, dated Jan. 8, 2020 (3 pages).
Examination report in corresponding patent application No. 202117058318 in India; mailed Feb. 6, 2023, 5 pages.

* cited by examiner

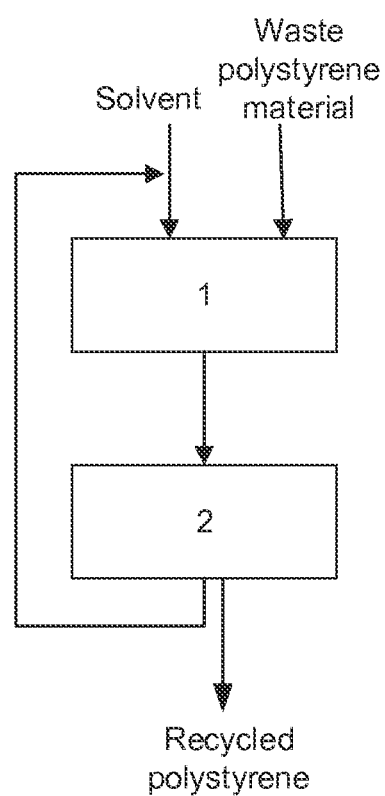

METHOD FOR RECYCLING POLYSTYRENE AND SOLVENT FOR DISSOLVING POLYSTYRENE

CROSS REFERENCE TO RELATED APPLICATIONS

This application is a United States National Phase Patent Application of International Patent Application Number PCT/FI2020/050470, filed on Jun. 26, 2020, which claims the benefit of priority to Finnish Application No. 20195582, filed on Jun. 28, 2019, the contents of which are incorporated by reference herein in their entireties.

FIELD OF THE INVENTION

The present invention provides a method for recycling polystyrene and a solvent for dissolving polystyrene in a dissolution recycling process.

BACKGROUND OF THE INVENTION

In recent years, it has become desirable from the viewpoint of waste-disposal, to establish a recycling technology for waste polystyrene material. Most of the products made of polystyrene-type materials are disposed of in landfills or incinerated which is not environmentally friendly. A dissolution method for recycling the polystyrene is being undertaken to replace the common disposal methods. It is known to use d-limonene, which is one of citrus plant essential oils, as a solvent for the polystyrene dissolution method. The d-limonene however has the disadvantage that it has a strong citrus odour and a high boiling point of 176° C., which set challenges to the operating environment of the industrial dissolution system. It is also liable to decompose and lacks stability because it is a natural product. Its availability is also dependent on the crop of said citrus.

SUMMARY OF THE INVENTION

It is an object of the present invention to reduce or even eliminate the above-mentioned problems appearing in prior art.

An object of the invention is to provide a novel solvent for dissolving polystyrene in a dissolution recycling process. Hence, an object of the present invention is to provide an environmentally friendly dissolution method for handling waste polystyrene material.

Further, it is an object of the present invention to provide a method for recycling polystyrene waste materials and more particularly an energy efficient and cost-effective recycling process for polystyrene waste, especially for foamed polystyrene waste.

In order to achieve among others the objects presented above, the invention is characterized by what is presented in the characterizing parts of the enclosed independent claims.

The embodiments and advantages mentioned in this text relate, where applicable, both to the method, the recycled polystyrene as well as to the uses according to the invention, even though it is not always specifically mentioned.

A typical method according to the invention for recycling polystyrene, the method comprising the steps of
obtaining waste material comprising rigid polystyrene foam material,
dissolving the waste material to a solvent, which comprises 1,3-dioxolane or isoamyl acetate, in a dissolving unit thereby obtaining a solution comprising dissolved polystyrene,
evaporating the solvent from the obtained solution comprising dissolved polystyrene at a temperature in the range of 20-70° C., at pressure of 50 mbar-1 atm, and recovering the recycled polystyrene and recirculating the solvent to the dissolving unit,
wherein the method is carried out in closed circulation system of the solvent.

A recycled polystyrene according to the present invention is obtained by the method of the present invention.

According to the present invention 1,3-dioxolane or isoamyl acetate is used as a solvent in dissolving waste polystyrene foam material. In a preferred embodiment according to the present invention, the selected solvent, as is, is used in dissolving waste polystyrene material.

It has been found that a solvent comprising 1,3-dioxolane or isoamyl acetate can be used in a dissolution recycling process of waste polystyrene foam material. Especially, said solvents have been found to be suitable for closed circulation system of the solvent. Temperature of the distillation process for recovering the recycled polystyrene material and recirculating the solvent can be kept in the range of 20-70° C. at pressure of 50 mbar-1 atm which enables energy efficient process conditions in industrial scale. These selected solvents have also been found to dissolve polystyrene from polystyrene waste material with an excellent dissolving ability and that only polystyrene is dissolved, and other compounds present in the waste material are insoluble. Said solvents have especially excellent ability to dissolve rigid polystyrene foam material, but they also dissolve all other materials comprising polystyrene for recovering polystyrene. In addition, the selected solvents are environmentally friendly, which means that they are non-hazardous. The closed circulation system of the solvent also decreases the amount of the solvent waste.

Further, it has been found that a method according to the present invention produces recycled polystyrene having substantially same properties as virgin polystyrene. The selected solvents require low temperatures in distillation and hence the obtained recycled polystyrene will not be subject to degradation during the recycling method according to the present invention.

A method according to the present invention utilizes closed circulation system of the solvent which also improves cost-efficiency of the method and make it more environmentally friendly. The reusable solvent is preferably environmentally safe and has a low boiling point and high vaporization rate. Low boiling point of the solvent makes possible to utilize waste heat of other process/processes. In an exemplary embodiment, the dissolution process according to the present invention can be integrated to same factory where foamed polystyrene products are manufactured, preferably using recycled polystyrene as raw material.

DESCRIPTION OF THE DRAWINGS

The appended FIG. 1 shows schematically process step of the method according to an embodiment of the present invention.

DETAILED DESCRIPTION OF THE INVENTION

In the method according to the present invention, the organic solvent comprising 1,3-dioxolane or isoamyl acetate is used in dissolving waste polystyrene material. These solvents provide efficient dissolving of the polystyrene from waste polystyrene material. The selected solvents require lower temperatures in distillation in comparison to commonly used d-limonene. Due to the lower boiling temperature, the selected solvents have a relatively small influence on the physical properties of the recycled polystyrene obtained by the method.

In an embodiment according to the present invention, a solvent comprises 1,3-dioxalane, which is also known as dioxolane (CAS number 646-06-0). It has a boiling point of 75.6° C. at normal atmospheric pressure (101.325 kPa).

In another embodiment according to the present invention, a solvent comprises isoamyl acetate (IMAC; CAS number 123-92-2), which also known as isopentyl acetate or methylbutyl acetate. It is an organic compound that is the ester formed from isoamyl alcohol and acetic acid. It has a boiling point of 142° C. at normal atmospheric pressure (101.325 kPa).

According to a preferred embodiment of the present invention, a solvent used in a dissolving is typically a single solvent, which is 1,3-dioxalane or isoamyl acetate, as described more detailed above. When using only one certain solvent, the system for recycling solvent is easier to configurate. A solvent may comprise water added to it. According to a preferred embodiment of the invention, the selected solvent is used, as is, without addition of water since the dilution with water may make the distillation process more difficult and requires further disposal of water with solvent residues. A method according to a preferred embodiment of the present invention is free of any solvent diluting step(s) which means that preferably the solvent includes solvent (as is).

According to a preferred embodiment of the present invention, a solvent comprises isoamyl acetate for better health and safety properties.

A method for recycling the waste polystyrene material in accordance with the present invention comprises the steps of dissolving the waste polystyrene material to a solvent, which comprises 1,3-dioxalane or isoamyl acetate, in a dissolving unit thereby obtaining a solution comprising dissolved polystyrene, and evaporating the solvent from the obtained solution at a temperature at which polystyrene does not decompose, thereby to separate the solvent from said solution. The selected solvents dissolve polystyrene from waste material, but not other compounds thereby providing solution comprising mainly polystyrene and hence enables easy further processing of said solution and recovering of polystyrene.

More generally the recycling method comprises dissolving polystyrene in said solvent in a dissolving unit for obtaining solution comprising dissolved polystyrene and thereafter separating the polystyrene and the solvent in a recovery unit. The method according to the present invention is not limited to any particular construction of the dissolving unit and/or the recovery unit.

According to the present invention waste polystyrene material refers to any waste material comprising polystyrene. Polystyrene is typically a homopolymer meaning that it is composed only of the monomer styrene in combination with itself. Polystyrene (PS) is available as both a typical solid plastic as well in the form of a rigid foam material. PS plastic is commonly used in a variety of consumer product applications and is also particularly useful for commercial packaging. The foam form of polystyrene is used most often as a packing material and/or insulation material. According to the present invention the waste material comprising polystyrene may be a mixture of different kind of waste materials comprising polystyrene. According to an embodiment of the present invention, waste polystyrene material may comprise solid polystyrene and/or foamed polystyrene. According to a preferred embodiment the waste material comprises rigid polystyrene foam material. The waste polystyrene foam material may comprise expanded polystyrene (EPS) and/or extruded polystyrene (XPS). Most product manufactured from polystyrene are not composed only of polystyrene; for example, they may contain chemicals added to a polymer to modify some physical, biological and/or chemical property. Examples of additives are e.g. colouring agents, fillers, flame retardants, lubricants and plasticizers. A solvent according to the present invention is selected so that it dissolves only polystyrene, not other compounds. Therefore, the method according to the present invention provides efficient method for dissolving polystyrene from waste material, which can be a mixture of the different kind of waste materials.

According to an embodiment of the present invention, the waste polystyrene material may be crushed in a smaller particle size prior to conveying it to a dissolving unit. Especially, if the waste polystyrene material comprises e.g. a rigid foamed polystyrene material. The dissolving of the waste polystyrene material is more efficient when waste material has substantially small particle size. Waste material may also be pre-treated by removing sand, rocks, metal parts or any other solid contaminants from among of the waste material.

In an embodiment according to the present invention, the waste polystyrene material, optionally crushed or otherwise size-reduced, is fed into a dissolving unit where it is mixed with the solvent. The dissolving of the polystyrene materials may be enhanced through use of heat and agitation of solution. According to an embodiment of the present invention, the temperature of the solution in a dissolving unit may be in the range of 20-75° C. In an embodiment according to the present invention dissolving of polystyrene is carried out at room temperature without separate heating steps.

According to an embodiment of the present invention, the waste polystyrene material and the solvent are added to the dissolving unit in a weight ratio of 1:5-1:2 to obtain solution comprising dissolved polystyrene which is not too viscous for further step(s) according to the present invention.

The method according to the present invention may also comprise removing of non-dissolved solid material or other contaminants from the obtained solution comprising dissolved polystyrene using at least one filtration and/or separation method. This step may also use for further clarifying the solution to remove finer particulate matter and improving the quality of the recycled polystyrene. The non-dissolved material is removed prior to evaporate solvent from the solution in the recovery section.

According to a preferred embodiment of the present invention, a method is carried out in closed circulation system of the solvent. Therefore, the present invention also provides a method for recycling the polystyrene foam, wherein the solvent is regenerated by distillation and used again as the solvent for the waste polystyrene material. Preferably, the system has arranged as closed to prevent loss of solvent to the atmosphere and facilitate reuse of the solvent in the process. The closed circulation system increases the environmental safety of the process. According to the present invention, a new solvent may be added to the closed circulation system, if necessary, to maintain the desired amount of solvent. According to a preferred embodiment of the present invention, a solvent used in a dissolving unit comprises solvent reused from the evaporation step.

In a method according to the present invention, after dissolution step, the solvent is evaporated from the obtained solution comprising dissolved polystyrene and solvent at a temperature of 20-70° C., at pressure of 50 mbar-1 atm. Evaporation in the temperature range of 20-70° C. makes possible to utilize waste heat of other process/processes in evaporation. In an exemplary embodiment, the dissolution process according to the present invention can be integrated to same factory where foamed polystyrene products are manufactured, preferably using recycled polystyrene as raw material and hence, the method according to the present invention provides energy efficient process for recycling of polystyrene waste material in low temperatures. According to an embodiment of the present invention, the solvent is evaporated from the obtained solution comprising dissolved polystyrene at a temperature in the range of 40-70° C., at pressure of 50 mbar-1 atm (1013.25 mbar). In a preferred embodiment according to the present invention, the solvent is evaporated from the obtained solution comprising dissolved polystyrene at a temperature in the range of 20-70° C. or 40-70° C., at pressure of 50 mbar-100 mbar. Both solvents according to the present invention can be evaporated from the obtained solution comprising dissolved polystyrene and solvent at a temperature <70° C., preferably in the range of 20-70° C., at pressure of 50 mbar-1 atm (1013.25 mbar), preferably under diminished air pressure in the range of 50 mbar-1 atm (1013.25 mbar). Lower temperature requires less energy, thereby providing an energy efficient process. According to an embodiment of the present invention, the obtained solution comprising dissolved polystyrene is gradually heated towards the temperature where solvent started to evaporate. The temperature is dependent on the solvent and pressure of the evaporation system. The reusable solvent which has evaporated or otherwise been removed during the process is condensed and transferred to a storage unit and/or directly to the dissolving unit for reuse in the process. The recycled polystyrene can be further processed, e.g. pelletized. The remaining solvents present in the recycled polystyrene evaporate during the further processing steps.

The low processing temperature and a substantially short processing time substantially eliminates degradation of the polystyrene during the method according to the present invention. Thus, the recycled polystyrene has substantially same properties as virgin polystyrene. Even when recycled from diverse waste polystyrene materials, the obtained recycled polystyrene product of the invention exhibits a surprisingly high quality when compared to a virgin polystyrene.

FIG. 1 describes schematically process steps according to the present invention. Waste polystyrene material and solvent are fed into a dissolving unit 1. The obtained solution comprising dissolved polystyrene is conveyed to the recovery unit 2 for separating the polystyrene and the solvent from each other. The reusable solvent which has evaporated in the recovery unit is condensed and transferred to a storage unit and/or directly recirculate to the dissolving unit.

EXPERIMENTAL PART

Example 1

In this Example, polystyrene recycling was studied with the solvents according to the present invention and with limonene as a reference.

Foamed polystyrene, 1 g, was added to 20 g of each solvent, weighted into an individual rounded bottom flask. Mixture was stirred at room temperature for 5 minutes to completely dissolve foamed polystyrene to the solvent. After polystyrene was dissolved, the round bottom flask was equipped with distilling bridge and a receiving flask and placed on oil bath. Mixture was heated gradually towards the boiling temperature of the solvent until the solvent started to evaporate. Distillation was continued for 1 hour at 1 atm pressure. Solvents and their boiling point are presented in Table 1. Limonene was used as reference. Polystyrene and residue solvent remaining in reaction flask and distilled solvent in receiving flask were weighted. Results are summarized in Table 2.

Compared to Limonene (reference solvent), both isoamul acetate and 1,3-dioxolane dissolves polystyrene and there were no remarkable differences between recovered polystyrene amounts and in the amounts of the distilled solvent. The solvents according to the present invention have a lower boiling point than limonene.

TABLE 1

Different solvents used in Example 1.

| Solvent | Boiling point (° C.) |
|---|---|
| Isoamyl acetate | 140 |
| 1,3-Dioxolane | 75 |
| Limonene (reference) | 176 |

TABLE 2

Polystyrene and residue solvent remaining in reaction flask and distilled solvent in receiving flask.

| Solvent | Polystyrene with residue solvent (g) | Distilled solvent (g) |
|---|---|---|
| Isoamyl acetate | 6.32 | 14.11 |
| 1,3-Dioxolane | 6.08 | 14.06 |
| Limonene | 6.83 | 13.23 |

Example 2

In this Example, polystyrene recycling was studied with the solvents according to the present invention and with limonene (reference solvent) under diminished air pressure for studying the effect of vacuum on distillation.

Foamed polystyrene, 1 g, was added to 20 g of each solvent, weighted into an individual rounded bottom flask. Mixture was stirred at room temperature for 5 minutes to completely dissolve foamed polystyrene to the solvent. After polystyrene was dissolved, the round bottom flask was equipped with distilling bridge, receiving flask and vacuum pump and placed on oil bath. Pressure of the system was set to 50 mbar.

When using 1,3-dioxolane as the solvent, after setting the vacuum solvent started to evaporate. Distillation was continued for 1 hour at 50 mbar pressure at room temperature.

When using isoamyl acetate as the solvent, mixture was heated gradually to 55-75° C. to evaporate the solvent. Distillation was continued for 1 hour.

When using limonene as the solvent, mixture was heated gradually to 95-115° C. to evaporate the solvent. Distillation was continued for 1 hour.

After distillation, polystyrene and residue solvent remaining in reaction flask and distilled solvent in receiving flask were weighted. Results are summarized in Table 3.

TABLE 3

Polystyrene and residue solvent remaining in reaction
flask and distilled solvent in receiving flask.

| Solvent | Polystyrene with residue solvent (g) | Distilled solvent (g) |
|---|---|---|
| Isoamyl acetate | 2.93 | 17.54 |
| 1,3-dioxolane | 4.87 | N/A |
| Limonene (reference) | 10.39 | 9.98 |

The results show that temperatures can be decreased for providing energy efficient evaporation process. Evaporation started already at room temperature when using 1,3-dioxolane as the solvent. Especially, isoamyl acetate can be distilled from the solution at diminished air pressure at a temperature that is optimal for industrial processes. Temperature can be controlled by pressure without affecting the recycling of solvent.

Example 3

Solubility of foamed polystyrene to the solvents according to the present invention and to limonene as a reference solvent was determined. 20 g of each solvent was weighted to an individual rounded bottom flask. Solvents were stirred at room temperature and foam polystyrene pieces were added to the mixtures until it no longer dissolved to the solvents. Mixtures were weighed and the amount of polystyrene foam dissolved was determined. Limonene was used as a reference solvent. Solubility test results are summarized in Table 4.

TABLE 4

Solubility of polystyrene foam in different solvents.

| Solvent (20 g) | Dissolved polystyrene foam (g) |
|---|---|
| 1,3-Dioxolane | 4.18 |
| Isoamyl acetate | 7.22 |
| Limonene (reference) | 2.25 |

The solvents according to the present invention dissolve polystyrene foam better as limonene.

Example 4

Effect of the recycling step to the molecular weight of polystyrene was determined with GPC measurement (WATERS GPC: waters 1515 Isocratic HPLC pump, waters 2414 refractive index detector, column heater compartment, Sodex KF801, KF802, KF804 columns). Sample of polystyrene was first dissolved to 1,3-dioxolane, isoamyl acetate and limonene and then separated from solvent according to procedure explained in the previous Example 1. Remaining polystyrene was dried and dissolved to tetrahydrofuran for the GPC measurements. Molecular weight of pure polystyrene was measured for reference. Results are summarized in Table 5. The recycled polystyrene was characterized by the number-average molecular weight (Mn), the weight average molecular weight (Mw), the peak molecular weight (MP), the size average molecular weight (Mz) and polydispersity index (Mw/Mn).

TABLE 5

Molecular weight of polystyrene.

| Solvent | Mn | Mw | MP | Mz | Mz + 1 | Polydispersity |
|---|---|---|---|---|---|---|
| 1,3-Dioxolane | 58894 | 89733 | 144428 | 114655 | 131655 | 1.523654 |
| Isoamyl acetate | 64734 | 97529 | 159544 | 121717 | 137550 | 1.506607 |
| Limonene | 61001 | 91704 | 150392 | 116204 | 132802 | 1.503333 |
| Reference* | 62769 | 93374 | 135775 | 117589 | 134160 | 1.487592 |

*Pure polystyrene

The selected solvents have a relatively small influence on the physical properties of the polystyrene.

The invention claimed is:

1. A method for recycling polystyrene, the method comprising the steps of:
   obtaining waste material comprising rigid polystyrene foam material;
   dissolving the waste material to a solvent, which comprises 1,3-dioxolane or isoamyl acetate, in a dissolving unit thereby obtaining a solution comprising dissolved polystyrene;
   evaporating the solvent from the obtained solution comprising dissolved polystyrene at a temperature in the range of 20-70° C., at pressure of 50 mbar-1 atm;
   recovering the recycled polystyrene and recirculating the solvent to the dissolving unit;
   wherein the method is carried out in closed circulation system of the solvent.

2. The method according to claim 1, wherein the waste material is crushed in a smaller particle size prior to conveying it to the dissolving unit.

3. The method according to claim 1, wherein the solvent is evaporated from the obtained solution comprising dissolved polystyrene at a temperature in the range of 40-70° C., at pressure of 50 mbar-1 atm.

4. The method according to claim 1, wherein the solvent is evaporated from the obtained solution comprising dissolved polystyrene at a temperature in the range of 20-70° C. or 40-70° C., at pressure of 50 mbar-100 mbar.

5. The method according to claim 1, wherein the obtained solution comprising dissolved polystyrene is heated gradually towards said temperature.

6. The method according to claim 1, wherein the waste material comprises expanded polystyrene (EPS) and/or extruded polystyrene (XPS).

7. The method according to claim 1, wherein the method is free of any solvent dilution step(s).

8. The method according to claim 1, wherein the method comprises
   removing non-dissolved solid material from the obtained solution comprising dissolved polystyrene using at least one filtration and/or separation method.

9. The method according to claim 1, wherein the waste material and the solvent are added to the dissolving unit in a weight ratio of 1:5-1:2.

* * * * *